C. A. SAXE.
Surveying Instrument.
No. 21,982. Patented Nov. 2, 1858.
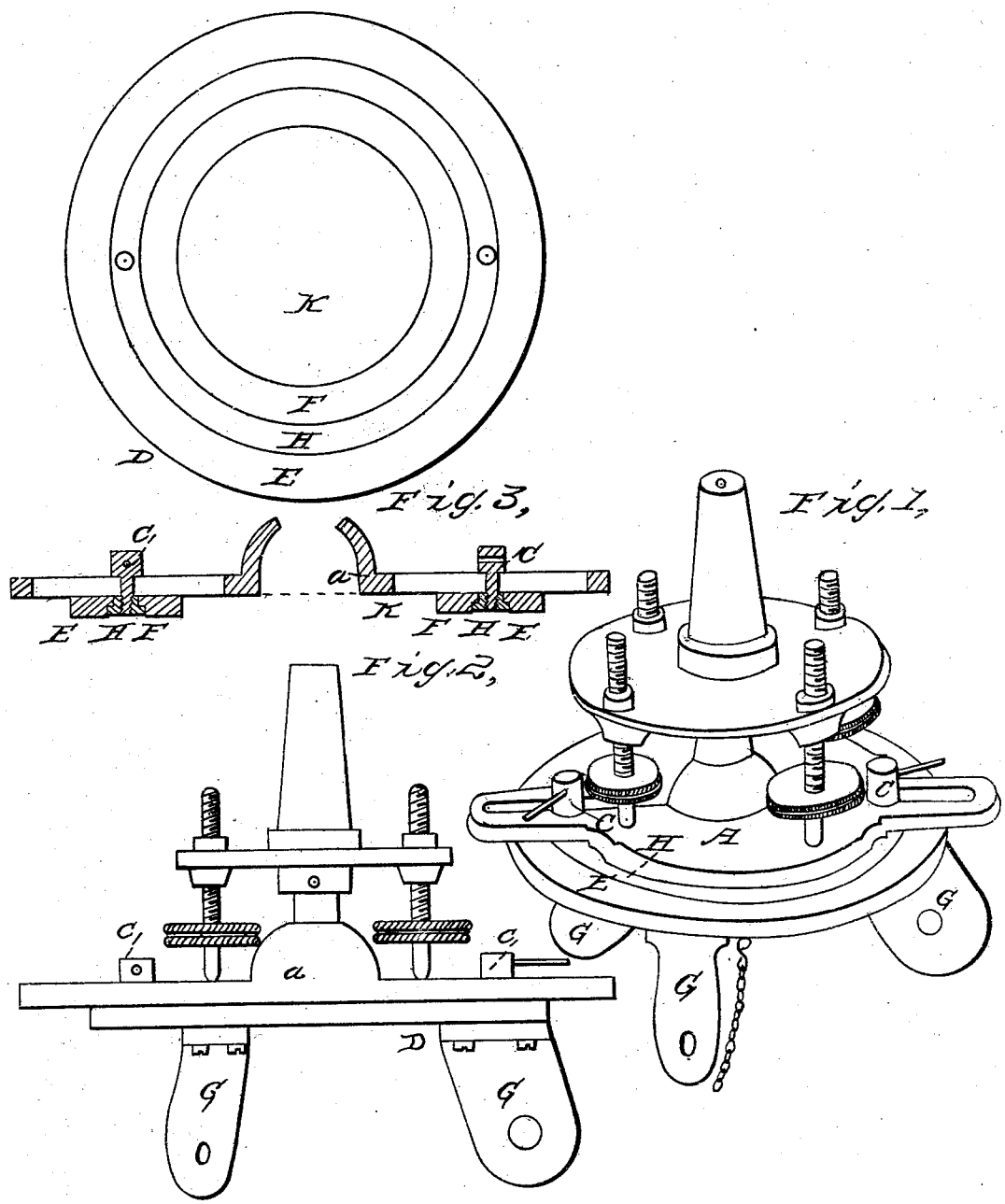

UNITED STATES PATENT OFFICE.

CHARLES A. SAXE, OF PHILADELPHIA, PENNSYLVANIA.

METHOD OF ADJUSTING THE PLUMMET WITHOUT MOVING THE TRIPOD IN SURVEYING INSTRUMENTS.

Specification of Letters Patent No. 21,982, dated November 2, 1858.

*To all whom it may concern:*

Be it known that I, CHARLES A. SAXE, of the city of Philadelphia, State of Pennsylvania, have invented a new and useful machine for moving the center or the axes of surveying instruments—to wit, surveyors' compasses, transits, theodolites, and solar compasses, or to move the plummet which is attached to the center or axes to any of these named instruments exactly above the given point in the ground without moving any of the three legs on which the whole instrument rests, also without unscrewing the screws with which the instrument is enabled to assume a horizontal position.

Heretofore the surveyor was obliged to move the lags of the instrument and also to unscrew the leveling screws, to set the center of the instrument exactly over the starting point, which occupied some time, and was often unsuccessful. My invention obviates this difficulty, and the starting point can be obtained by only sliding the instrument, and I do hereby declare that the following is a full and exact description of the same.

The nature of my invention consists in constructing the head of tripod and lower plate of the instrument or ball plate (as it is generally called) upon which rest the leveling screws in such a manner that the ball plate to which is attached the instrument may be moved (parallel to the head plate of tripod) and thereby bring the center or axis to any point within the circle of said head plate.

To enable others skilled in the art to make and use my invention I will proceed to describe its construction and operation, the annexed drawing making a part of this specification in which—

Figure 1 is a perspective view; Fig. 2, a longitudinal elevation; Fig. 3, a transverse section.

I construct my ball plate as represented at A in the drawing with two slits B B which are cut through the plate A for the purpose of sliding the ball plate. In those slits B B play the screws C C which are screwed into the center ring of the three rings, which constitute the head plate of tripod as represented at D, E, and H. Of this head plate are screwed permanently to the pieces G, to which are bolted the legs of tripod while the ring H remains free to be revolved parallel to D and E. The center of instrument to which is attached the plumb line and plummet can be placed over any point within the circle K by unscrewing the screws C C, revolving the ring H and sliding the ball plate A in any direction requisite.

What I claim as my invention and desire to secure by Letters Patent is—

The arrangement above described for placing surveying instrument's centers over any point within the circle K without moving the legs of the instrument, and unscrewing the leveling screws, but by unscrewing the screws C C moving the ball plate A and revolving the ring H as herein described.

CHARLES A. SAXE.

Witnesses:
SAM. R. SEIBERT,
CHAS. F. HAELFFROCHT,